United States Patent Office 3,453,278
Patented July 1, 1969

3,453,278
PREPARATION OF HYDROCARBON-SUBSTITUTED PYRAZINES AND PIPERAZINES FROM ALPHA-NITRO-KETONES
Alan F. Ellis, Murrysville, Pa., assignor to Gulf Research & Development Company, Pittsburgh, Pa., a corporation of Delaware
No Drawing. Filed Apr. 6, 1967, Ser. No. 628,849
Int. Cl. C07d 51/00, 51/64, 51/76
U.S. Cl. 260—250    13 Claims

ABSTRACT OF THE DISCLOSURE

A process for the preparation of hydrocarbon-substituted pyrazines, hydrocarbon-substituted piperazines and mixtures thereof which comprises:

contacting in the liquid phase a reaction mixture comprising an alpha-nitro-ketone which contains at least three carbon atoms and which has at least one hydrogen atom attached to the same carbon atom which bears the nitro group and a water solubilizing solvent for said alpha-nitro-ketone,
with a hydrogenation catalyst under hydrogenation conditions including a temperature less than the decomposition temperature of said alpha-nitro-ketone and a pressure sufficient to maintain said reaction mixture in the liquid phase.

---

This invention relates to a process for the preparation of hydrocarbon-substituted pyrazines and piperazines from alpha-nitro-ketones.

In accordance with the invention hydrocarbon-substituted pyrazines, hydrocarbon-substituted piperazines and mixtures thereof are prepared by a process which comprises:

Contacting in liquid phase a reaction mixture comprising an alpha-nitro-ketone which contains at least three carbon atoms and which has at least one hydrogen atom attached to the same carbon atom which bears the nitro group and a water solubilizing solvent for said alpha-nitro-ketone,
With a hydrogenation catalyst under hydrogenation conditions including a temperature less than the decomposition temperature of said alpha-nitro-ketone and a pressure sufficient to maintain said reaction mixture in the liquid phase.

The alpha-nitro-ketone charge stock which can be converted to the desired hydrocarbon-substituted pyrazine, hydrocarbon-substituted piperazine or mixtures thereof can be any nitro-ketone which contains at least three carbon atoms, a nitro group (—$NO_2$) on the carbon atom adjacent the keto group (—C=O—), and at least one hydrogen atom attached to the same carbon atom which bears the nitro group. The alpha-nitro-ketone suitably has between 3 and 25 carbon atoms, and preferably has between 4 and 16 carbon atoms.

The more preferred alpha-nitro-ketones have the formula:

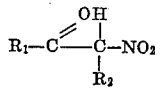

where $R_1$ is selected from the group consisting of an unsubstituted aliphatic radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23, preferably from 2 to 14.

It is still more preferred that $R_2$ be hydrogen and $R_1$ be an unsubstituted aliphatic hydrocarbon radical having from 1 to 14 carbon atoms. When $R_2$ is hydrogen, the alpha-nitro-ketone is a 1-nitro,2-ketone, and conversion of this ketone always results in the production of a 2,5-disubstituted piperazine and pyrazine. By "disubstituted" is meant dihydrocarbon substituted, and by hydrocarbon is meant an alkyl, cycloalkyl or phenyl groups.

Examples of suitable nitro-ketones include, but are not limited to:

1-nitro-propanone,
1-nitro-butanone-2,
2-nitro-butanone-3,
1-nitro-hexanone-2,
1-nitro-octanone-2,
1-nitro-decanone-2,
1-nitro-dodecanone-2,
1-nitro-tetradecanone-2,
1-nitro-hexadecanone-2,
1-nitro,4-ethyldodecanone-2,
1-nitro-eicosanone-2,
1-nitro-pentacosanone-2,
3-nitro-tetradecanone-4,
2-nitro,5,6-diethyloctanone-3,

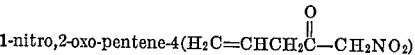

1-nitro,2-oxo-hexene-5,
1-nitro,2-oxo-decene-9,
2-nitro,3-oxo-decene-9,
2-nitro-cyclopentanone,
2-nitro-cyclohexanone,
2-nitro,4-hexylcyclohexanone,
beta-nitro-acetaphenone,
beta-nitro-propiophenone, and
1,2-diphenyl,1-nitro-2-oxo-ethane.

It has been found that the alpha-nitro-ketones will condense to form the desired hydrocarbon-substituted pyrazines, hydrocarbon-substituted piperazines and mixtures thereof when treated in the liquid phase with hydrogen while in contact with a hydrogenation catalyst in accordance with the following equation:

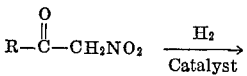

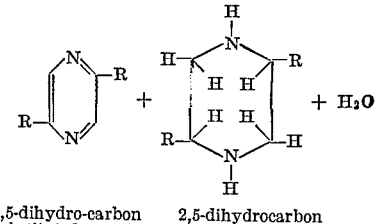

2,5-dihydro-carbon       2,5-dihydrocarbon
substituted pyrazine     substituted piperazine where R is as defined above.

Most of the alpha-nitro-ketones, however, are solids under normal conditions and a solvent is required to dissolve the alpha-nitro-ketones so that they may be contacted with a hydrogenation catalyst in the liquid phase. When the alpha-nitro-ketones condense to form the desired hydrocarbon-substituted pyrazines, hydrocarbon-substituted piperazines and mixtures thereof, water is formed as a by-product. The water tends to deactivate the hydrogenation catalyst and it is necessary that the water be removed from the surface of the catalyst since the water is not soluble in the alpha-nitro-ketone or in the pyrazine-piperazine product. The solvent for the alpha-nitro-ketone must also therefore be able to solubilize the water formed during the reaction. The solvent must also, of course, be inert in the sense that it does not react with the charge materials or the product. The solvent is generally a polar organic type material. Examples of preferred solvents include organic water soluble compounds having 1 to 4 carbon atoms and from 1 to 2 alcoholic hydroxyl groups, such as methanol, ethanol, propyl alcohol, isopropyl alcohol, n-butyl alcohol, 2-methyl-1-propanol, secondary butyl alcohol, ethylene glycol, and propylene glycol; organic water soluble acids, such as acetic and propionic acids; formamides, such as dimethylformamide and diethylformamide; and materials such as dioxane. It is only necessary that the solvent be a liquid material which dissolves both the alpha-nitro-ketone charge stock and any water formed in the reaction and which is unreactive with the alpha-nitro-ketone or the reaction products produced, except in the case of organic acids which are used to complex with the amine function in the product to control the pH of the reaction mixture. Such materials can easily be determined by one having ordinary skill in the art by a few solubility experiments.

In addition to maintaining the reactants and products in a single homogeneous phase, the solvent used in the system also serves to moderate the reaction temperature since the subject reaction is quite exothermic. Further, the alpha-nitro-ketone tends to form high boiling unknown products in addition to cyclizing, especially as the reaction temperature increases. The reaction solvent defined above is also believed to perform an additional function in keeping the surface of the hydrogenation catalyst free by a washing-type mechanism of any of these higher boiling products of unknown composition which might form. Sufficient solvent must, of course, be employed to maintain the alpha-nitro-ketone charge stock and any water produced in the reaction in a single phase. Much larger amounts of solvent are preferred. Suitable weight ratios of the solvent to the alpha-nitro-ketone are between 1:1 and 20:1, or more, with the preferred weight ratio of solvent to alpha-nitro-ketone between 3:1 and 10:1.

Normally, the alpha-nitro-ketone is dissolved in the desired solvent at some desired temperature and the mixture is contacted with a hydrogenation catalyst under hydrogenation conditions under a suitable hydrogen partial pressure. The reaction can be run in a batch system or in a flow system with the flow system being preferred. As an example of a suitable flow-type system the mixture of the alpha-nitro-ketone and solvent can be passed downflow through a bed of a supported hydrogenation catalyst while the hydrogen is passed concurrently downflow through the bed. The reaction product can be collected and thereafter treated by any suitable means, such as by distillation, to separate the desired hydrocarbon-substituted pyrazine and hydrocarbon-substituted piperazine products.

Any hydrogenation catalyst can suitably be employed in the subject reaction. Hydrogenation catalysts are well known in the art and generally include the metals, metal oxides and metal sulfides from Groups VI and VIII of the Periodic Table. Other metals, such as copper and tin, also serve as suitable hydrogenation catalysts, especially when combined with metals of Groups VI and VIII, such as chromium and nickel.

Suitable metals include, but are not limited to, chromium, molybdenum, tungsten, iron, cobalt, nickel; the noble metals, such as ruthenium, rhodium, palladium, osmium, iridium and platinum; and copper and tin, or mixtures thereof. The catalyst may be employed unsupported either alone or in admixture with each other or as alloys. The catalyst can also suitably be supported on carrier materials which are also well known in the art, such as alumina, silica, magnesia, or mixtures thereof, pumice, kieselguhr, charcoal, or naturally or synthetically prepared zeolitic materials. It is preferred that the support be a non-cracking type support, i.e. one having a low number of Lewis acid sites. It is therefore preferred that supports, such as alumina, silica and silica alumina be reduced in acidity, such as by being steam treated before being used in the process of this invention. The preferred support is charcoal, such as the commercially available Pittsburgh Activated Carbon, grade BPL (purchased from Pittsburgh Chemical Company). Both high and low surface area supports can suitably be employed and a hydrogenation metal or metals can be deposited on the support by any method well known in the art, such as by vacuum impregnation from aqueous solutions or by the method of incipient wetness. The catalysts are then suitably dried and reduced in a stream of hydrogen. When the metal is supported, the metal content is usually between 1 and 25 weight percent of the support, with the preferred amounts of metal depending upon the particular metal chosen. For example, the platinum group metals are normally employed in much lower concentrations, i.e., of 1 to 10 weight percent, whereas the non-noble metals, such as nickel are normally employed in the 1 to 25 weight percent range. The preferred hydrogenation catalysts for use in the process of this invention are those comprising nickel or a platinum group metal, especially palladium, or a combination of nickel and a platinum group metal. The most preferred catalyst is between 1 and 10 weight percent palladium on charcoal.

The temperature of the hydrogenation reaction is important in that it must be kept sufficiently low so that extensive decomposition of the alpha-nitro-ketone does not occur. The alpha-nitro-ketones are thermally unstable and decompose at temperatures of about 130° C. to 200° C., depending on the molecular weight of the alpha-nitro-ketone charge stock. The lower the reaction temperature, the more active must be the hydrogenation catalyst. The lower limit of reaction temperature is believed to be about 20° C. while the upper limit is the decomposition of the particular alpha-nitro-ketone charge stock, which upper limit is believed to be about 200° C. The usual reaction temperature is between about 50° and 120° C. Since the reaction is exothermic and since the charge stock does decompose at a relatively low temperature, care must be taken, such as by supplying additional amounts of solvent or injecting cooling solvent or hydrogen at various points through the reactor bed to maintain the reaction temperature within the above-described limits. The reaction pressure must be sufficient to keep the reactants in the liquid phase. The lowest pressure for practical operation is atmospheric. Increased pressures and temperatures tend to favor hydrogenation, but may also tend to favor the undesired polymerization reaction. Pressures of 450 p.s.i.g. have suitably been employed, while increasing the pressure to 1500 p.s.i.g. has caused little change in the nature of the reaction or in the ratio of pyrazine and piperazine in the reaction product. Pressures between atmospheric and 3000 p.s.i.g. or higher can therefore suitably be employed with the preferred pressures being between 100 p.s.i.g. and 2000 p.s.i.g.

The subject process is a hydrogen consuming process in that eight moles of hydrogen are consumed per mole of piperazine produced while five moles of hydrogen are consumed per mole of pyrazine products produced. The reaction pressure must therefore be provided by a hydrogen containing gas suitably one containing between 50 and 100 percent hydrogen.

The liquid hourly space velocity based on the alpha-nitro-ketone is suitably between 0.05 and 1.0 volumes of alpha-nitro-ketone per volume of catalyst per hour with the preferred liquid hourly space velocities between 0.1 and 0.8.

The reaction product consisting of the solvent, water, hydrocarbon-substituted pyrazine, hydrocarbon-substituted piperazine, decomposition products and any higher boiling products is removed and distilled to recover the various components. The solvent can be recycled to the reactor if desired. The mixture of hydrocarbon-substituted piperazine and hydrocarbon-substituted pyrazine can be recovered as such or distilled and recovered separately.

The invention will be further described with reference to the following experimental work.

The first three examples represent batch runs made in a Parr shaker hydrogenation apparatus.

Example 1

A mixture of 2.0 grams of 1-nitro-butanone-2 (density 1.17 grams per ml. at 25° C.) and 50 mg. of powdered platinum oxide (purchased from Englehard Industries) in 20 ml. of glacial acetic acid was placed in the Parr shaker apparatus under 40 p.s.i.g. of hydrogen at room temperature for one hour. About six pounds of hydrogen pressure were taken up, i.e. the hydrogen pressure was reduced from 40 to 34 pounds. Gas chromatographic analysis of the product indicated 2,5-diethylpyrazine and 2,5-diethylpiperazine were the major products.

Example 2

Example 1 was repeated except the glacial acetic acid was replaced with benzene. No hydrogen uptake was noted after one hour and examination of the reaction mixture indicated the normally finely dispersed reduced catalyst had agglomerated and coated the walls of the reaction vessel. The 1-nitro-butanone-2 was recovered substantially unreacted.

A comparison of Examples 1 and 2 shown that water miscible solvents, such as glacial acetic acid are suitable for the subject reaction while water immiscible solvents, such as benzene are unsuitable.

Example 3

The run for this example was similar to Example 1 except the catalyst and reaction conditions were different. In this run, 2.0 grams of 1-nitro-butanone-2 and 100 mg. of Raney nickel (purchased from the Raney Catalyst Company) in 20 ml. of glacial acetic acid was hydrogenated in the Parr apparatus at 45 p.s.i.g. and 50° C. for two hours. Gas liquid chromatographic analysis of the product indicated 2,5-diethylpyrazine was the major product.

A comparison of Examples 1 and 3 shows that various hydrogenation catalysts can be employed in the process of this reaction even at temperatures as low as room temperature (Example 1) which was about 20° C.

Example 4

A solution of 17.3 parts of 1-nitro-octanone-2 (density 0.95 grams per ml. at 25° C.) in 208 parts of isopropyl alcohol was passed at a liquid hourly space velocity of 0.9 volume of solution per volume of catalyst per hour downflow through a bed of a supported nickel catalyst (Harshaw Chemical Company 0104T catalyst, which is a 58 percent nickel on kieselguhr) at 500 p.s.i.g. and 120° C. with a hydrogen downflow rate of about 200 volumes of hydrogen per volume of catalyst per hour. Gas chromatographic analysis of the effluent samples indicated the presence of 2,5-dihexylpyrazine.

A comparison of Examples 3 and 4 shows, first of all, that a higher carbon number ketone charge stock can be employed. In addition, Example 4 shows that a flow system is suitable as is the use of a supported nickel catalyst.

The remaining runs were made in a flow reactor system where the liquid feed, i.e. the nitro-ketone in a solvent was admixed with the hydrogen gas and both passed downflow through a bed of supported catalyst.

Example 5

A one molar solution of 1-nitro-butanone-2 in pure ethanol was passed downflow through a bed of an unsupported nickel-tin alloy containing 69 percent nickel and 31 percent tin at a rate of 0.63 volume of solution per volume of catalyst per hour along with about 300 volumes of hydrogen per volume of catalyst per hour at 80° C. and a hydrogen pressure of 410 p.s.i.g. A hot spot of 130° C. developed in the column and the effluent as analyzed by gas liquid chromatography indicated the presence of 2,5-diethylpyrazine.

Example 5 shows yet other types of hydrogenation catalysts can be employed.

A series of runs were made charging one molar solutions of either 1-nitro-butanone-2 or 1-nitro-decanone-2 (density 0.93 grams per ml. at 25° C.) downflow through a bed of a five percent palladium on charcoal catalyst. The catalyst was prepared by depositing palladium chloride on Pittsburgh activated carbon, grade BPL and subsequently activated by heating to 350° C. in hydrogen at atmospheric pressure. The activated carbon had a surface area of 1,000–12,000 square meters per gram and was 4–10 mesh in size.

In some of the runs, acetic acid was employed together with ethanol as the solvent. The purpose of the acetic acid was to complex with the pyrazine and piperazine compounds as formed to prevent them from catalyzing conversion of charge to undesired products, such as esters. The data for this series of runs is tabulated in the table below.

TABLE

| Example No. | Solvent | Reaction [2] temperature, °C. | Pressure, p.s.i.g. | H₂ flow, v./v./hr. | Solution, LHSV | Product Mole, percent | | Ratio of Depy./Depp. | Percent efficiency to desired products |
|---|---|---|---|---|---|---|---|---|---|
| | | | | | | Depy.[3] | Depp.[4] | | |
| 6 | Ethanol plus Ethanol plus acetic acid [1] | 40 | 450 | 533 | 1.8 | 18 | 11 | 1.64 | 29 |
| 7 | do [1] | 68 | 450 | 533 | 1.8 | 32 | 53 | 0.6 | 85 |
| 8 | do [1] | 79 | 450 | 533 | 1.8 | 46 | 47 | 0.98 | 93 |
| 9 | do [1] | 128 | 450 | 533 | 1.8 | 40 | 48 | 0.834 | 88 |
| 10 | do [1] | 144 | 450 | 533 | 1.8 | 41 | 43 | 0.95 | 84 |
| 11 | do [1] | 170 | 450 | 533 | 1.8 | 25 | 34 | 0.74 | 59 |
| 12 | do [1] | 90 | 850 | 533 | 1.8 | 48 | 46 | 1.0 | 94 |
| 13 | Ethanol | 86 | 450 | 533 | 1.8 | 47 | 41 | 1.1 | 88 |
| 14 | do | 126 | 450 | 533 | 1.8 | 59 | 23 | 2.56 | 82 |
| 15 | do | 90 | 1500 | 666 | 1.8 | 30 | 42 | 0.71 | 72 |
| 16 | do | 126 | 1500 | 666 | 1.8 | 40 | 35 | 1.14 | 75 |
| 17 [5] | do | 113 | 480 | 666 | 4.0 | [6] 63 | [7] 15 | 4.2 | 78 |
| 18 [5] | Ethanol plus acetic acid [1] | 116 | 480 | 666 | 4.0 | [6] 65 | [7] 25 | 2.6 | 78 |
| 19 | Dioxane | 108 | 480 | 666 | 3.2 | [6] 65 | [7] 15 | 4.4 | 78 |

[1] The ethanol solution was also one molar in acetic acid.
[2] This is the highest temperature in the catalyst bed and is at the top of the bed where the reaction is occurring.
[3] Depy.-2,5-diethylpyrazine.
[4] Depp.-2,5-diethylpiperazine.
[5] In runs 17, 18 and 19, a 0.5 molar solution of 1-nitrodecanone-2 was charged.
[6] In runs 17, 18 and 19, the product is 2,5-dioctylpyrazine.
[7] In runs 17, 18 and 19, the product is 2,5-dioctylpiperazine.

A comparison of Examples 6 through 11 shows the effect of increasing the reaction temperature. At 40° C. (Example 6) the percent efficiency to the desired products was only 29 percent. In example 6, 35 percent of a high boiling product of unkown composition was also recovered. The efficiency of the catalyst increased at the increased temperatures to 170° C. (Example 11). In Example 11, 12 mole percent of the product was recovered as propionic acid, indicating decomposition of the starting materials. For a support palladium catalyst, the optimum temperature range is from about 40° C. to about 170° C.

A comparison of Examples 8 and 12 shows that the increased pressures of Example 12 do not result in any noticeable change in product composition.

A comparison of Examples 8 and 9 with Examples 13 and 14 shows that the elimination of the acetic acid has little, if any, effect at the lower temperature, but the use of pure ethanol at the higher temperature seems to result in a decreased efficiency to total desired products, but a much higher ratio of alkyl-substituted piperazines. to alkyl-substituted piperazines. Minor amounts of propionic acid, i.e. to 2 to 6 mole percent were found in the products of Examples 13 and 14.

The use of pressures of 1500 p.s.i.g. as in Examples 15 and 16 compared to 450 p.s.i.g. in Examples 13 and 14 appears to lower the over-all efficiency and ratio of diethylpyrazine to diethylpiperazine, but the effect of increased temperature on increasing this ratio still appears to be valid.

In runs 17 to 19, a 0.5 mole solution of 1-nitro-decanone-2 was employed as the charge stock. It appears that the ratio of the dioctylpyrazines to the dioctylpiperazine product was quite high. In addition, in run 17 it appeared that about 22 mole percent of the product was present as methyl pelargonate. The addition of acetic acid in run 18 reduced the amount of methyl pelargonate formed. In run 19, diozane was used as the solvent in place of ethanol and no methyl pelargonate was found in the product.

Example 20

A solution of 1-nitro-hexanone-2 (density 1.05 grams per ml. at 25° C.) in methanol is passed downwardly through a bed of a five percent palladium on charcoal catalyst at about 100° C. and a solution liquid hourly space velocity of about 2.

The product is a mixture of 2,5-dibutylpyrazine and 2,5-dibutylpiperazine.

Resort may be had to such variations and modifications as fall within the spirit of the invention and the scope of the appended claims.

I claim:
1. A process for the preparation of hydrocarbon-substituted pyrazines, hydrocarbon-substituted piperazines and mixtures thereof which comprises:
   reacting in the liquid phase a reaction mixture comprising an alpha-nitro-ketone which contains from 3 to 25 carbon atoms and which has at least one hydrogen atom attached to the same carbon atom which bears a nitro group and a water solubilizing solvent for said alpha-nitro-ketone,
   with a hydrogenation catalyst under hydrogenation conditions including a temperature less than the decomposition temperature of said alpha-nitro-ketone and a pressure sufficient to maintain said reaction mixture in the liquid phase.

2. A process according to claim 1 wherein the hydrogenation catalyst comprises at least one metal, metal oxide or metal sulfide from Groups VI and VIII of the Periodic Table.

3. A process according to claim 1 wherein the alpha-nitro-ketone has the formula:

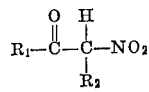

where $R_1$ is selected from the group consisting of an unsubstituted aliphatic radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23, preferably from 2 to 14.

4. A process according to claim 3 wherein the solvent is an organic water soluble compound having 1 to 4 carbon atoms and from 1 to 2 alcoholic hydroxyl groups.

5. A process according to claim 4 wherein the hydrogenation catalyst comprises at least one supported noble metal.

6. A process according to claim 5 wherein the hydrogenation catalyst is palladium on charcoal.

7. A process according to claim 5 wherein the solvent is methanol.

8. A process according to claim 3 wherein the alpha-nitro-ketone is 1-nitro-butanone-2.

9. A process according to claim 3 wherein the solvent comprises dioxane.

10. A process for the preparation of hydrocarbon-substituted pyrazines, hydrocarbon-substituted piperazines and mixtures thereof which comprises:
    passing in the liquid phase a reaction mixture comprising an alpha-nitro-ketone which contains at least three carbon atoms and which has at least one hydrogen atom attached to the same carbon atom which bears a nitro group and a water solubilizing solvent for said alpha-nitro-ketone,
    together with hydrogen downflow through a bed of hydrogenation catalyst under hydrogenation conditions including a temperature less than the decomposition temperature of said alpha-nitro-ketone and a pressure sufficient to maintain said reaction mixture in the liquid phase.

11. A process according to claim 10 wherein the alpha-nitro-ketone has the formula:

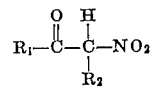

where $R_1$ is selected from the group consisting of an unsubstituted aliphatic radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23, preferably from 2 to 14; the solvent is diozane; and the hydrogenation catalyst comprises at least one supported noble metal.

12. A process according to claim 10 wherein the alpha-nitro-ketone has the formula:

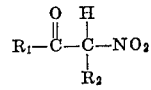

where $R_1$ is selected from the group consisting of an unsubstituted aliphatic radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23, preferably from 2 to 14; where the solvent comprises an organic water soluble compound having 1–4 carbon atoms and from 1–2 alcoholic hydroxyl groups.

13. A process according to claim 3 wherein the solvent comprises acetic or propionic acid.

References Cited

UNITED STATES PATENTS 2,875,206   2/1959   Levis et al.
2,933,534   4/1960   Stansburg et al.

NICHOLAS S. RIZZO, Primary Examiner.

U.S. Cl. X.R.

260—268